June 2, 1925.  1,540,624
E. H. HAUPT
ANTISKIDDING DEVICE
Filed Sept. 8, 1924
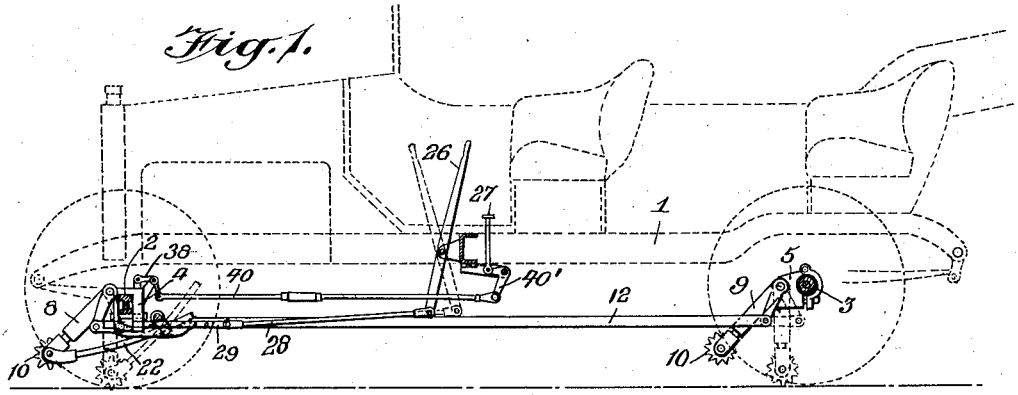
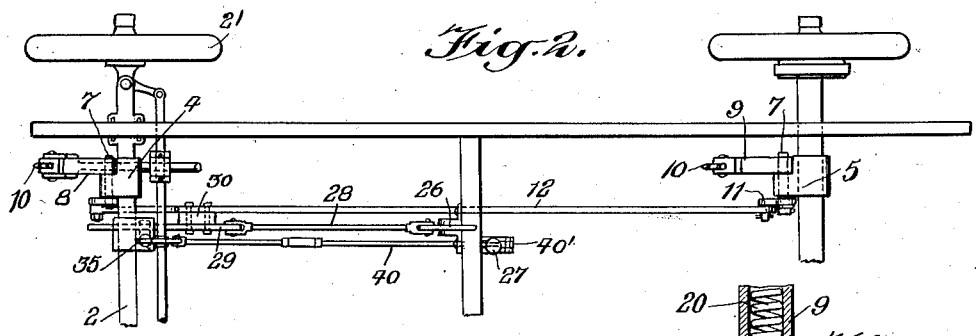
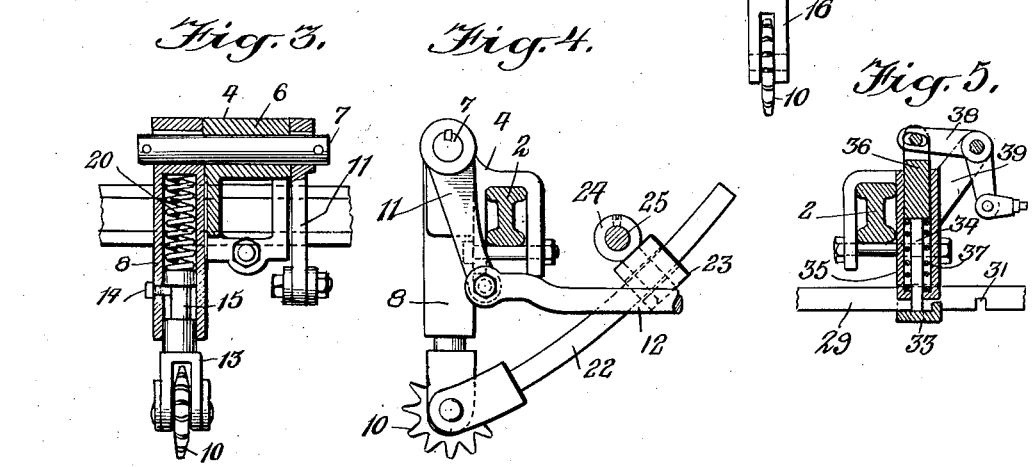
WITNESSES
INVENTOR
Emil H. Haupt
BY
ATTORNEYS Patented June 2, 1925.

1,540,624

UNITED STATES PATENT OFFICE.

EMIL H. HAUPT, OF NEW YORK, N. Y.

ANTISKIDDING DEVICE.

Application filed September 8, 1924. Serial No. 736,552.

*To all whom it may concern:*

Be it known that I, EMIL H. HAUPT, a citizen of the United States, and a resident of the city of New York, borough of Manhattan, in the county and State of New York, have invented a new and Improved Antiskidding Device, of which the following is a full, clear, and exact description.

This invention relates to anti-skidding devices, and more particularly to an attachment for automobiles or other vehicles which will prevent lateral skidding and accident incident thereto.

An object of the invention is to provide an improved mechanism on an automobile under the control of the operator, which is normally held out of operative position but which can be quickly released so as to cause anti-friction devices, such as star wheels to engage with the ground adjacent the front and rear of the vehicle and absolutely prevent lateral skidding of the car.

A further object is to provide anti-skidding devices which have a relative amount of resilient vertical movement to compensate for uneven places in the pavement, and, furthermore, provide at least a front anti-skidding device with means connected to the steering mechanism so that the device turns with the front wheel and does not drag on the ground.

A further object is to provide a mechanism of the character stated which can be readily attached to any ordinary automobile, which can be easily and quickly operated, and which will most efficiently perform the functions for which it is intended.

With these and other objects in view, the invention consists in certain novel features of construction and combinations and arrangements of parts which will be more fully hereinafter described and pointed out in the claims.

In the accompanying drawings—

Figure 1 is a view in side elevation of my improved mechanism showing the same attached to an automobile, portions of the automobile being shown in section and portions by dotted lines;

Figure 2 is a fragmentary plan view;

Figure 3 is an enlarged view in transverse section through the anti-skidding mechanism at the front of the vehicle;

Figure 4 is a view in side elevation of the mechanism shown in Figure 3;

Figure 5 is a view in vertical section through the locking or holding mechanism;

Figure 6 is a fragmentary view mainly in vertical section through the rear anti-skidding device.

1 represents an automobile provided with the ordinary front and rear axles 2 and 3, respectively. While I have illustrated and shall describe my improved attachment or anti-skidding devices as connected directly to the front and rear axles it is obvious that they may be otherwise supported, and I do not wish to be limited in this particular.

To the front and rear axles I secure brackets 4 and 5, respectively. These brackets are substantially alike and are provided with horizontal bearings 6 for the reception of short horizontal shafts 7 located in a plane in front of the axle. 8 and 9 represent tubular arms which are fixed to the shafts 7 and which support star wheels 10 or other suitable ground engaging members. The shafts 7 also have crank arms 11 fixed thereto and these crank arms are connected by a link 12 so that the anti-skidding devices at the respective ends of the vehicle are compelled to operate in unison.

The ground engaging wheel 10 of the front anti-skidding device is supported in a fork 13 having rotary as well as longitudinal movement in the arm 8, and a pin or screw 14 projects through the arm 8 into a recessed portion 15 of the fork 13 so as to limit the longitudinal movement and allow the necessary turning movement.

The rear anti-skidding wheel or device 10 is supported in a fork 16, the shank 17 of which projects into the arm 9, and this shank has a longitudinal groove 18 receiving the screw 19 in the arm to limit the longitudinal movement of the fork. This rear fork, however, is held against turning movement.

Within the arms 8 and 9 coil springs 20 are mounted and exert downward pressure on the forks to maintain the anti-skidding wheels in engagement with the ground or to allow them to move vertically a certain distance to compensate for uneven surfaces in the pavement. As it is desirable that the front anti-skidding wheel 10 shall turn with the front wheels 21 of the vehicle, I provide a curved arm 22 fixed to the fork 13 and movable in a sleeve 23, the latter having a collar 24 secured to the steering rod 25 so that as the steering rod is moved the anti-skidding wheel will be turned in exact accordance with the position of the front wheel.

To control the operation of the anti-skidding device I provide a hand lever 26 and a foot plunger 27 both located in convenient reach of the operator. The hand lever 26 is connected by a link 28 with a bar 29. This bar 29 is located parallel to the link 12 above referred to, and is secured to said link but spaced therefrom by a block 30, as clearly shown in Figure 2.

The bar 29 is provided in its lower edge with any desired number of notches 31 although I preferably provide two of these notches. A catch 33 functions to engage in either of the notches 31 and hold the bar 29 and the anti-skidding devices in the desired position of adjustment. This catch 33 is fixed to a rod 34 projecting into a housing 35 and provided at its upper end with a plunger 36. A coil spring 37 in the housing exerts upward pressure on the plunger tending to maintain the catch in locked engagement with the bar 30. A bell crank lever 38 is mounted on an arm 39 fixed to the housing 35 and this bell crank lever is connected by a link 40 with a bell crank lever 40' mounted on the automobile frame and to which the foot plunger 27 is connected. It will thus be noted that the foot plunger 27 controls the catch 33, and the lever 26 controls the position or operates to move the anti-skidding arms 8 and 9.

The operation is as follows:

Assuming the parts to be in the position shown in Figure 1, the catch 33 will engage with one of the notches 31 in bar 29 so as to maintain the anti-skidding devices in elevated position. In an emergency, or, in other words, when the anti-skidding devices are needed, the operator depresses the foot plunger 27. This causes a release of the catch 33, and the weight of the arms 8 and 9 will cause them to swing downwardly and rearwardly and bring the anti-skidding wheels 10 into contact with the ground. The forward momentum of the automobile will bring these arms back to vertical anti-skidding position, and this rear movement is limited by the engagement of the arms 8 and 9 with the brackets 4 and 5 or with the axles or other portions of the vehicle. To insure this operating position, the upper end of the lever 26 may be forced forwardly, or, in most cases, a mere release of the locking mechanism will permit the devices to fall to operative position. When the anti-skidding devices are in normal position the catch 33 will automatically spring into one of the notches 31 and hold the parts in this position.

To elevate the anti-skidding wheels it is necessary to first depress the plunger 27 to hold the lock or latch 33 out of operative engagement and then move the upper end of the lever 26 rearwardly to manually elevate the anti-skidding wheels. When they reach their normal elevated position the catch or lock 33 will hold them in such location until they are again released.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. An anti-skidding device for vehicles, comprising a support, an arm pivotally connected to the support, a ground engaging member at the free end of the arm, and means connecting the ground engaging member with the steering mechanism of an automobile whereby said ground engaging member is caused to turn with the front wheels of the vehicle.

2. An anti-skidding device, comprising a support adapted to be fixed to the forward portion of an automobile, an arm pivotally connected to said support, a ground engaging rotary member carried by the arm, a rod connected to the lower end of the arm, and a sleeve fixed to the steering rod of the automobile and receiving said last-mentioned rod whereby the ground engaging member is caused to turn with the movement of the steering rod.

3. The combination with an automobile, supports fixed to the front and rear portions of the automobile, arms pivotally connected to said supports, ground engaging rotary members at the free ends of the arms, elastic means connecting said ground engaging members with the arms, a link connecting the arms and compelling their operation in unison, a lever operatively connected to the link, a latch adapted to hold the arms in either elevated or lowered position, and a foot-operated device controlling the latch.

4. The combination with an automobile, brackets fixed to the front and the rear axles of the automobile, arms pivotally connected to the brackets, rotary ground engaging members, forks supporting said members, shanks on the forks mounted in the arms, springs in the arms exerting pressure on the forks, a link operatively connecting the arms to compel their simultaneous movement, a bar fixed to the link and having notches therein, a spring latch engaging the notches and holding the parts in positions of adjustment, a hand lever operatively connected to the bar, and a foot-operated device controlling the latch.

EMIL H. HAUPT.